United States Patent [19]
Moberly et al.

[11] 3,742,091
[45] June 26, 1973

[54] VINYL MONOMER POLYMERIZATION PROCESS

[75] Inventors: Charles W. Moberly; Gerald R. Kahle, both of Bartlesville, Okla.

[73] Assignee: Phillips Petroleum Company, Bartlesville, Okla.

[22] Filed: Aug. 17, 1970

[21] Appl. No.: 64,504

[52] U.S. Cl. .......... 260/879, 260/92.8 R, 260/95 R, 260/881, 260/884, 260/885
[51] Int. Cl. ..... C08f 15/06, C08f 15/00, C08f 19/08
[58] Field of Search ...................... 260/879, 92.8 R, 260/884

[56] References Cited
UNITED STATES PATENTS
3,594,358  7/1971  Moberly .......................... 260/92.8
3,281,345  10/1966  Kuhne .............................. 204/163
3,432,576  3/1969  Beer .................................. 260/878
3,546,323  12/1970  Hwa et al. ........................ 260/879
3,578,646  5/1971  Moberly et al. ................. 260/85.7

Primary Examiner—Joseph L. Schofer
Assistant Examiner—William F. Hamrock
Attorney—Young and Quigg

[57] ABSTRACT

Agglomeration of vinyl polymers produced by liquid phase polymerization reactions is substantially inhibited when the polymerization is effected in the presence of certain polymeric additives which are soluble in the liquid monomer. In some instances the polymeric additive imparts to the polymeric product, upon molding, improved impact strength.

8 Claims, 1 Drawing Figure

Patented June 26, 1973
3,742,091
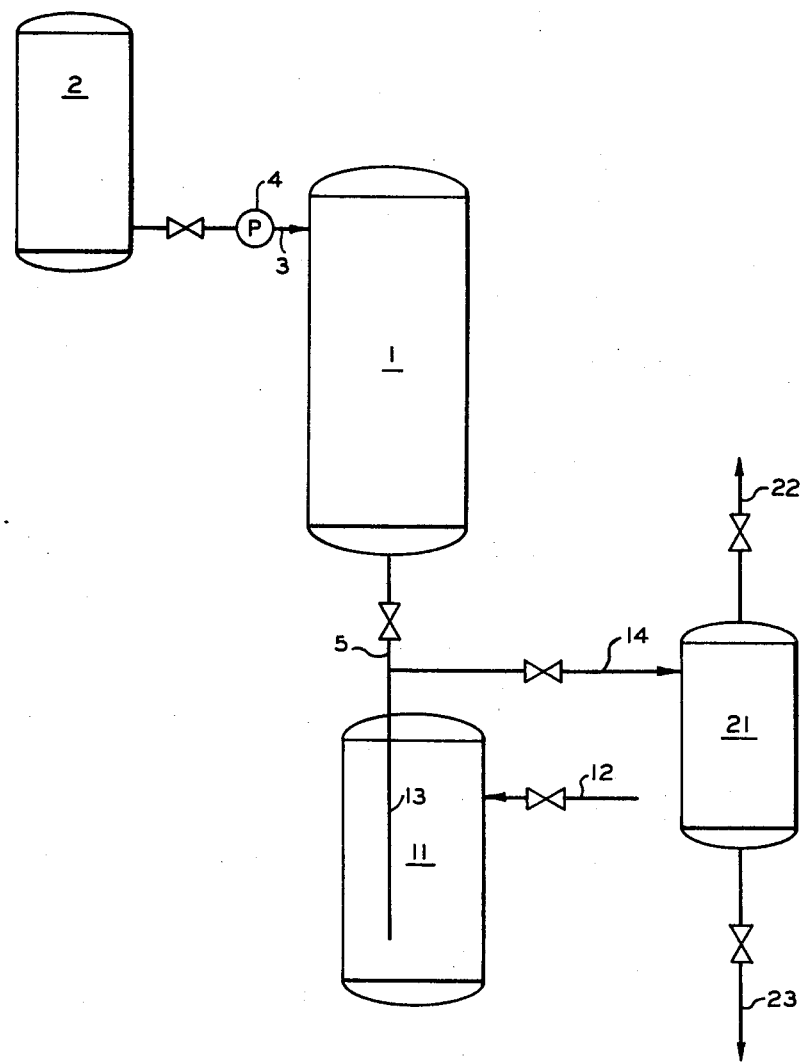
INVENTORS
C.W. MOBERLY
G.R. KAHLE
BY
Young & Quigg

VINYL MONOMER POLYMERIZATION PROCESS

This invention relates to the polymerization of unsaturated monomers. Particularly, the invention relates to an improved process for the polymerization of vinyl monomers, especially to the polymerization in liquid phase, of vinyl chloride alone or with copolymerizable monomers, for obtaining polymers and copolymers having improved properties.

Vinyl polymers such as poly(vinyl chloride) are well known articles of commerce. Processes for producing such polymers include bulk polymerization wherein the polymerization is conducted in the liquid phase in the absence of a substantial amount of solvent for the polymer by merely adding an oil-soluble polymerization catalyst to the liquid monomer or liquid mixture of monomers; solution polymerization wherein a solvent for the polymer product is added to the polymerization zone; emulsion polymerization wherein the charge to the reaction zone comprises liquid vinyl monomer or monomers, water-soluble polymerization catalyst, water and a water-soluble emulsifying agent; and suspension polymerization wherein a charge comprising an oil phase consisting of an oil-soluble catalyst and liquid monomer or monomers dispersed in an aqueous phase consisting of water, suspending agents, wetting agents and coagulation agents is polymerized under conditions of vigorous agitation.

Of these systems, bulk polymerization is the oldest and simplest. Generally, equipment used for bulk polymerizations is simpler and less costly as there is neither water nor solvent to be separated. The polymeric products generally have a high purity with good heat stability and excellent transparency, and the polymer beads have a preferred structure since the mechanism of association between the chains of the high polymers is different in the absence of any emulsifier or protective colloid. Notwithstanding these advantages, bulk liquid polymerization of vinyl monomers has been generally restricted to laboratory and research investigations while the majority of commercial polymerizations are effected by either emulsion or suspension polymerization systems. With bulk polymerizations, the degree of conversion of the monomer to polymer is limited by the fact that the polymerization reaction yields a thick paste or slurry and the homogeneity of the product decreases as the mass thickens, the increase in conversion resulting in a decreasing ability to maintain the agitation upon which homogeneity depends. In addition, the vinyl polymerization is an exothermic reaction and, in the thickened condition of the reaction mass, removal of the reaction heat is most difficult. Thus, commercial polymerizations have been predominantly effected by emulsion and suspension polymerization since dispersions of solid polymers in water are easy to agitate and the water serves as a thermal buffer permitting more effective dispersion of the heat given off in the course of the polymerization reaction.

Recently, it has been found that vinyl monomers can be commercially polymerized in the vapor phase. This technique involves the polymerization of vinyl compounds and mixtures thereof in the presence of a polymerization catalyst and in the absence of any substantial amount of solvent for the polymer, under conditions of pressure and temperature such that the polymerization is effected in the vapor phase. The preferred embodiment effects the vinyl polymerization reaction at conditions under which the monomer is in the vapor state in the presence of polymer particles as seed. The vapor phase polymerization can be effected in a single-stage fluidized bed reaction zone wherein a charge comprising liquid vinyl monomer or monomers, and monomer-soluble polymerization catalyst, is introduced into a reaction zone together with vaporized monomer. The vaporized monomer serves to aerate or fluidize the reaction zone; and, as polymer begins to form, it is maintained in a fluidized condition by the vaporized monomer and serves as seed for the propagation of the polymerization reaction.

A modification of the vapor phase polymerization utilizes a liquid phase agitated reactor and a gas fluidized vapor phase reactor in series. In such a system it is often desirable to utilize the liquid phase reactor to produce polymer which acts as a solid support for any catalyst remaining in the liquid phase reactor and for additional catalyst introduced into the fluidized bed vapor phase reactor as well as seed for the propagation of the polymerization taking place in the vapor phase.

A further modification which provides a more uniform product comprises screening the reaction effluent from the fluidized bed reaction zone to remove the polymer particles having undesirable particle size. The particles which are too large are passed through a grinder to produce new seed polymer. Particles which are smaller than desired product particle size can be returned to the reaction zone directly or admixed with new polymer particles for impregnation with catalyst. The catalyst-impregnated seed particles are then returned to the vapor phase reaction zone. The terms "impregnate," "impregnation," and the like as used herein shall be understood to mean addition of additive to polymer particles by any means known to the industry, as by spraying, dipping and the like.

Investigations into the course of liquid phase and vapor phase polymerization reactions, as well as combinations thereof, have led to the conclusion that the thick paste or slurry which tends to deleteriously affect monomer conversion and heat transfer is due in large measure to the agglomeration of the polymer particles resulting from the absorption of monomer into the formed polymer. This condition results in a low conversion of monomer to polymer and a marked tendency in the polymer particles to adhere to each other, thus forming polymer masses of undesirably large size which are difficult to break up with normal agitation methods and thus contributes to the poor commercial acceptance of such processes. Because of the desirable characteristics of polymer produced in both liquid phase and vapor phase polymerization it would be highly desirable to provide a more commercially acceptable liquid phase polymerization system.

It has now been discovered that the agglomeration of vinyl polymers produced by liquid phase polymerization of vinyl monomers such as vinyl chloride can be materially inhibited when the polymerization is effected in accordance with this invention. Thus, in accordance with this invention, the agglomeration of vinyl polymers is materially inhibited by a process wherein a vinyl monomer is polymerized or copolymerized with other monomers, in the substantial absence of a solvent for the polymer, in the presence of a polymerization initiator and certain hereinafter defined polymeric materials which are soluble in the liquid monomer, and the thus-formed polymer is recovered. In a preferred embodiment, the liquid phase polymerization product is used as seed polymer for a subsequent vapor phase polymerization process. In this embodiment, the amount of polymer from the liquid phase polymerization step which acts as seed polymer in the subsequent vapor phase polymerization zone is in the range of 15 to 60 weight per cent, based on weight of total polymer product.

The process of this invention is applicable to the production of polymers of vinyl chloride including poly(vinyl chloride) and copolymers of vinyl chloride and one or more polymerizable monomers, e.g., vinyl esters such as vinyl acetate, vinyl butyrate and vinyl stearate; vinyl ethers such as vinyl lauryl ether and vinyl cetyl ether; olefins such as ethylene and propylene; and halogenated olefins such as vinylidene chloride, tetrafluoroethylene and perfluoropropylene. Such polymers are produced by the use of a monomer charge comprising from 100 to 75 weight per cent of vinyl chloride and from zero to 25 weight per cent of at least one monomer polymerizable with vinyl chloride under liquid phase polymerization conditions.

The polymerization initiators suitable for use in the practice of the invention can be any of the known catalysts for the polymerization of vinyl-type monomers. Preferred polymerization initiators are free radical precursors such as perhaloethanes, e.g., 1,1-dichloro-1,2,2,2-tetrabromoethane; organic peroxides such as dimethyl peroxide, dicyclohexyl peroxide, diphenyl peroxide, bis(alpha,alpha-diisopropyl-4-ethylbenzyl) peroxide, and acetyl cyclohexanesulfonyl peroxide; dialkyl peroxydicarbonates such as diisopropyl peroxydicarbonate, di(2-ethylhexyl) peroxydicarbonate and di(sec-butyl) peroxydicarbonate; azo compounds such as disclosed in U. S. Pat. Nos. 2,471,959 and 2,520,338; azo amidine compounds such as disclosed in U.S. Pat. No. 2,579,300; and cyclic amidines such as azobis-N,N'-methyleneisobutyramidine monoacetate. Suitable additional free radical precursors are listed, for example, in Faraday Society, "Symposium on Free Radicals," London (1953), and Ingram, "Free Radicals," Academic Press, Inc., New York (1958). The dialkyl peroxydicarbonates have been found to be particularly useful vinyl polymerization initiators, with diisopropyl peroxydicarbonate being presently preferred because of its reactivity. Preparation of a number of peroxydicarbonates is described in U.S. Pat. Nos. 2,370,588 and 2,464,012, which are incorporated herein by reference.

The polymeric additives which can be employed as agglomeration inhibitors in the processes of this invention are selected from the class consisting of hydrogenated butadiene-styrene copolymers, methyl methacrylate-styrene-acrylonitrile terpolymers, poly(vinyl acetate) and mixtures thereof, which are soluble in the liquid vinyl monomer or liquid mixture of vinyl monomers. Hydrogenated butadiene-styrene copolymers are preferred inhibitors. It has been found that the use of hydrogenated butadiene-styrene copolymers results in a polymer of vinyl chloride which has, upon subsequent molding, an impact strength greater than that of the polymer produced in the absence of the hydrogenated butadiene-styrene copolymer. The hydrogenated butadiene-styrene copolymers are produced by hydrogenation of butadiene-styrene random, block or graft copolymers until substantially no olefinic unsaturation remains, e.g., less than 5 per cent, with the aromatic unsaturation remaining essentially unchanged. The weight ratio of butadiene to styrene in the butadiene-styrene copolymer preferably is in the range of about 5:95 to 95:5.

The agglomeration inhibitors can be added to the reaction zone in any convenient manner. Thus, the polymeric additives can be introduced as a single charge, intermittently or continuously during the polymerization as a separate stream in a sequential manner or simultaneously with the remaining ingredients of the charge recipe or in admixture with any or all of the charge materials. Preferably, the inhibitor charge is dissolved in the liquid monomer or liquid mixture of monomers prior to introduction of the additive into the reaction zone. Regardless of the manner in which the inhibitor is introduced into the polymerization zone, it is essential that the introduction be accomplished before termination of the liquid phase polymerization. Preferably, the inhibitor will be introduced at or near the beginning of the polymerization reaction.

In the bulk liquid phase polymerization in which polymers of vinyl chloride are produced in accordance with the invention, the polymeric additive concentration should be within the range of about 0.2–4, preferably 0.5–2.5, weight per cent, based on the weight of the monomer(s) employed. The polymerization temperature should be within the range of about 30°–350° F., preferably 100°–170° F. Although the reaction time can vary within a broad range, depending in part on the polymerization temperature, it will usually be within the range of about 30 seconds to 50 hours, and preferably within the range of 10 minutes to 10 hours. The pressure should be sufficient to maintain the monomer charge substantially in the liquid phase, generally within the range of 2–50 atmospheres, preferably 8–30 atmospheres. The polymerization can be carried out in a batch, semicontinuous or continuous method of operation.

When the liquid phase polymerization is followed by a vapor phase polymerization step, in a two-step polymerization process, the vapor phase polymerization is carried out at temperatures and for times as indicated above, at a pressure such that a monomer charge is substantially in the vapor phase, generally within the range of about 0.3–20 atmospheres, preferably about 4–13 atmospheres. In this two-step process the liquid phase and/or vapor phase polymerization steps can be carried out in a batchwise, semicontinuous or continuous method of operation. Additionally, the liquid phase polymerization process of this invention can be employed as the first stage of a two-stage polymerization process such as that described in French Patent No. 1,382,072, that is, in a process wherein the bulk polymerization of vinyl chloride or mixture of vinyl chloride and monomer or monomers copolymerizable therewith is initiated in a first stage under conditions of rapid agitation such as by high speed stirring and carried to a conversion level in the range of about 7 to 15 per cent and the polymerization is completed in a second zone under conditions of reduced agitation such as by stirring at a substantially slower speed than in the first zone.

The accompanying drawing illustrates an embodiment of the invention wherein the vinyl polymerization is effected in a two-stage liquid phase-vapor phase system.

Referring to the drawing in greater detail, there is shown a liquid phase reactor 1. This reactor is equipped with a multi-impeller agitator (not shown)

and heating means for temperature control. The reactor 1 is supplied with liquid monomeric feedstock containing polymerization initiator dissolved therein from charge solution reservoir 2 through line 3. The reactor is maintained in a liquid-full condition by maintaining the reactor pressure at a constant predetermined value, so chosen as to maintain the monomer charge in the liquid state at the selected polymerization temperature, by means of pump 4 which is pressure controlled to supply liquid charge on demand. Liquid phase reactor 1 is connected through line 5 to vapor phase reactor 11. Reactor 11 is provided with an auger (not shown) which circulates polymer from the perimeter of the reactor toward the center and heating means for temperature control. Polymerization initiator can be supplied to reactor 11 through line 12 as needed. The polymer formed in reactor 1 is transferred by pressure differential to reactor 11 through line 5 and dip tube 13, which terminates in the reactor at a point just above the auger blades. Product is taken from reactor 11 through dip tube 13 and passed to product receiver 21 through line 14.

The following examples are illustrative of the practice of this invention.

EXAMPLE I

In a series of five runs vinyl chloride was polymerized in the liquid phase at 122° F., using 0.1 weight per cent diisopropyl peroxydicarbonate as initiator. In four of the runs 2.0 weight per cent of a polymeric additive was incorporated in the formulation prior to polymerization of the vinyl chloride. A control run was carried out in which no polymeric additive was employed. The results of these runs are summarized in Table I.

TABLE I

| Run | Additive | Polymerization Time, hr. | Monomer Conversion % | Appearance |
|---|---|---|---|---|
| 1 | None (control) | 1.0 | 11.4 | Agglomerated |
| 2 | Poly(vinyl acetate)[a] | 1.33 | 14.2 | Some agglomeration |
| 3 | Methyl methacrylate-styrene-acrylonitrile[b] | 1.5 | 13.3 | Thick slurry |
| 4 | Methyl methacrylate-styrene-acrylonitrile[b] | 2.0 | 15.2 | Soft, agglomerated |
| 5 | Hydrogenated butadiene-styrene[c] | 1.5 | 23.4 | Very thick slurry |

[a]Gelva V-7 poly(vinyl acetate) (Monsanto) having a molecular weight (weight average) of 45,000.
[b]XT polymer 250 (American Cyanamid).
[c]Prepared by the copolymerization of butadiene (75 parts by weight) and styrene (25 parts by weight) by the method of U.S. 2,975,160, followed by hydrogenation of the resulting essentially random butadiene-styrene copolymer by the method of U.S. 3,416,899. The hydrogenated butadiene-styrene copolymer, which had essentially no residual olefinic unsaturation, had a Mooney viscosity (ML-4 at 212° F.) of 45.

Thus, use of the polymeric additives shown in Table I made possible the polymerization of vinyl chloride to a higher degree of conversion than was possible in the absence of the polymeric additive, for the presence of the polymeric additive had an inhibiting effect on the tendency of the poly(vinyl chloride) to agglomerate.

EXAMPLE II

In each of six bottles vinyl chloride was polymerized in the liquid phase, each bottle having been charged with 70.0 g. of vinyl chloride, 1.4 g. of hydrogenated essentially random butadiene-styrene copolymer [prepared as described in footnote c of Table I and having a Mooney viscosity (ML-4 at 212° F.) of 98, with retention of only 1.2 per cent of the olefinic unsaturation of the nonhydrogenated polymer], and 0.5 ml of a pentane solution containing 0.07 g. of diisopropyl peroxydicarbonate. The capped bottles were shaken at 122° F. unitl thick slurries were obtained (75–100 minutes). From the cooled bottles was obtained a total of 74 g. of polymer upon evaporation of unreacted vinyl chloride. The 74 g. of polymer was charged to a 1-litter reactor, which was then flushed with vinyl chloride. The reactor was heated to 140° F., after which 0.07 g. of diisopropyl peroxydicarbonate in 45 g. of vinyl chloride was added. The pressure was increased to, and then maintained at, 115 psig by the addition of vinyl chloride, the temperature being maintained at 140° F. for 1.5 hours as the vapor phase polymerization of vinyl chloride occurred. The total polymer yield was 239 g., including the 74 g. of seed polymer charged to the reactor.

A formulation of, by weight, 90 parts of the above poly(vinyl chloride), 8 parts Blendex 401 processing aid, 2 parts Advastab T-360 stabilizer, 1 part dibutyltin dilaurate, 0.5 part Advawax 140 lubricant, and 0.5 part Advawax 280 lubricant was compression molded at 370° F. for 3 minutes at 5000 pounds platen pressure, then for 3 minutes at 20,000 pounds platen pressure, then for 3 minutes at 30,000 pounds platen pressure, and finally for 6 minutes at 40,000 pounds platen pressure, after which the molded product (A) was cooled to room temperature. A control formulation differing only in that commercial poly(vinyl chloride) (PVC-40; Diamond Alkali, now Diamond Shamrock) was used instead of the poly(vinyl chloride) produced in this example, was molded in like manner to give molded product B as a control. Properties of molded products A and B at about 23° C. are given in Table II.

TABLE II

| | Product A | Product B |
|---|---|---|
| Flexural Modulus[a], psi × 10⁻³ | 361 | 387 |
| Tensile yield[b], psi | 6580 | 7390 |
| Elongation[b], % | 116 | 91 |
| Izod Impact[c], ft.-lb./in. notch | 12.22 | 1.47 |
| Hardness[d], Shore D | 81 | 82 |

[a]ASTM D 790-63.
[b]ASTM D 638-64T.
[c]ASTM D 256-56.
[d]ASTM D 1706-61.

Thus, the Izod impact of molded product A, a product of the invention, was far superior to that of molded product B, a control product outside the scope of the invention. Additionally, the other properties shown in Table II for product A were quite satisfactory.

EXAMPLE III

The use of polymeric additive in a two-stage liquid phase-vapor phase integrated flow system for polymerization of vinyl chloride to poly(vinyl chloride) (PVC) is illustrated in the accompanying drawing. The liquid phase reactor 1, equipped with two propeller agitators turning at 1,725 rpm inside a draught tube to provide agitation, was operated at 200 psig pressure to maintain it liquid-full at the operating temperature of 140° F. The pressure was kept at 200 psig by pumping from a charge solution reservoir 2, with the pump 4 being turned on upon demand by a pressure switch. The capacity of the reactor at operating conditions (140° F. and 200 psig) was 875 grams of vinyl chloride.

The vapor phase reactor 11 was equipped with an agitator consisting of two auger blades on the outside of a cylinder which agitator lifted the poly(vinyl chloride) powder on the outside of the cylinder and allowed it to circulate down through the inside of the cylinder. At the start of the operation of the vapor phase reactor 11, 100 grams of a commercial poly(vinyl chloride), Rucon B-32, was added to the reactor 11. After flushing with nitrogen and vinyl chloride in succession, the reactor 11 was heated to 140° F. Just prior to starting flow into the vapor phase reactor 11 from the liquid phase reactor 1, there was added to it from a charge cylinder through line 12 0.07 gram of diisopropyl peroxydicarbonate (IPP) in 45 grams of vinyl chloride. The pressure was maintained at a maximum of 115 psig. The pressure was lowered to about 100 psig intermittently to transfer poly(vinyl chloride) product to the product receiver. By making this transfer of product through a dip tube 13, the stirred polymer bed was maintained at the level of the end of the dip tube 13.

The product receiver 21 was vented through line 22 at intervals during operation to maintain it at a pressure lower than that of the reactor 11 to allow the transfer to occur. The product receiver 21 was emptied every hour through outlet 23 to obtain the product.

The integrated system was operated in the following manner. The liquid phase reactor 1 after charging as shown in Table III was maintained in a liquid-full state under stirring at 140° F. and 200 psig for one hour prior to start of charging from it to the vapor phase reactor 11. During this one-hour period, a small quantity of charge solution was pumped in on demand to maintain the pressure at 200 psig because of the difference in density of the monomer and the polymer. The amount required when 8.6 per cent of monomer has been converted to polymer was calculated as 32 grams. The integrated operation of the two reactors was then started using these steps. The valve at the outlet of the vapor phase reactor 11 was opened momentarily to reduce the pressure in the vapor phase reactor 11 to approximately 100 psig. The valve at the bottom outlet of the liquid phase reactor 1 was opened momentarily to allow poly(vinyl chloride) slurry in vinyl chloride (or vinyl chloride solution of additive) to flow through the transfer line 5 and expand into the vapor phase reactor 11 to bring the pressure in the vapor phase reactor 11 to a maximum of 115 psig. The liquid phase reactor 1 was reestablished in liquid-full state by pumping in vinyl chloride solution from a charge cylinder 2. These steps were repeated with a frequency which produced a charge rate of 310 to 315 grams per hour average over a two-hour period.

The liquid phase reactor 1 was sampled after each hour's operation through a dip tube (not shown) extending about 1 inch into the slurry to obtain a sample. The vinyl chloride was vaporized, the residual polymer was vacuum dried and the per cent solids was calculated from the weight of polymer and weight of sample. At the end of the operation, the polymer was recovered from the liquid phase reactor 1 to obtain the solids content, but was not included in the product used for evaluation. The products from the hourly collection and the product from the vapor phase reactor 11 at the end of operation were weighed and combined for evaluation.

The original charge to the liquid phase reactor 1 and the charge solution used in the two-hour operation for a control run and for a run using hydrogenated essentially random butadiene-styrene copolymer ($H_2$ Bd/S) [prepared as described in footnote c of Table I and having a Mooney viscosity (ML-4 at 212° F.) of 110, with retention of only 0.13 per cent of the olefinic unsaturation of the nonhydrogenated polymer] are shown in Table III.

TABLE III

| | No Polymeric Additive | $H_2$ Bd/S Additive |
|---|---|---|
| | Original Charge | |
| Vinyl chloride, g | 800 | 800 |
| $H_2$ Bd/S, g | 0 | 4.5[a] |
| Initiator solution, g | 0.10 g IPP in 45 g vinyl chloride | 0.10 g IPP and 4.5 g dibutyltin dilaurate in 45 g vinyl chloride |
| | Charge Solution | |
| Vinyl chloride, g | 800 | 800 |
| Dibutyltin dilaurate | 0.0 | 4.5 |
| IPP, g | 0.10 | 0.10 |
| $H_2$ Bd/S | 0.0 | 4.5[b] |

[a] Vinyl chloride and $H_2$ Bd/S stirred at 140° F. in reactor for about 1.5 hours prior to adding initiator solution.
[b] $H_2$ Bd/S was dissolved in 100 g vinyl chloride at 140° F. in a beverage bottle, cooled, transferred to a charge cylinder before adding IPP and vinyl chloride to make a total of 800 grams.

The summary of the operations is shown in Table IV.

TABLE IV

| | No Polymeric Additive | $H_2$ Bd/S Additive |
|---|---|---|
| Average charge rate, g/hr. | 310 | 315 |
| Liquid Phase reactor solids, % | | |
| At start of integrated operation | 5.4 | 8.6 |
| After 1 hour of integrated operation | 7.8 | 12.2 |
| After 2 hours of integrated operation | 8.9 | 15.4 |
| Vapor Phase reactor product, g. | | |
| After 1 hour | 49.1 | 36.2 |
| After 2 hours | 50.6 | 116.9 |
| Residual | 110.5 | 115.7 |
| Total vapor phase product | 210.2 | 268.8 |
| Calculated PVC from liquid phase reactor, g[a] | 46.1 | 75.8 |
| PVC made in vapor phase reactor, g[b] | 64.1 | 93.0 |

[a] Calculated from average per cent solids and charge rate.
[b] Excluding 100 grams Rucon B-32 PVC seed.

It is shown that operation can be carried out in the liquid phase reactor at least to 8.9 per cent solids without polymeric additive and at least to 15.4 per cent solids with $H_2$ Bd/S additive present. It has previously been shown in Example I that agglomeration occurs at 11.4 weight per cent solids in the absence of polymeric additive.

The products were evaluated in a rigid PVC formulation to compare physical properties. The improvement in Izod impact of the product containing $H_2$ Bd/S from integrated liquid phase-vapor phase operation over a product made in the same manner and over a commercial product used as seed in the vapor phase part of the operation is shown in Table V.

TABLE V

| | No Polymeric Additive | $H_2$ Bd/S | Rucon B-32 |
|---|---|---|---|
| Additive in product, %[a] | 0 | 1.2 | 0 |
| Blendex 401 in formulation[b], parts | 8 | 6 | 8 |
| Dibutyltin dilaurate in product, % | 0 | 1.17 | 0 |
| Dibutyltin dilaurate in formulation, parts | 1.0 | 0.0 | 1.0 |
| Rucon B-32 in product, % | 48 | 37 | 100 |

Properties[c]

| | | | |
|---|---|---|---|
| Flexural Modulus, psi × 10⁻³ | 401 | 366 | 389 |
| Tensile yield, psi | 7510 | 7100 | 7210 |
| Elongation, % | 184 | 139 | 207 |
| Izod Impact, ft.-lb/in. notch | 1.10 | 6.99 | 1.87 |
| Hardness, Shore D | 83 | 80 | 81 |

[a] Calculated from charge rate and H₂ Bd/S content.
[b] Rigid formulation.

| | |
|---|---|
| PVC | 90 parts |
| Blendex 401 | 6 or 8 |
| Advastab T-360 | 2.0 |
| Dibutyltin dilaurate | 0 or 1.0 (to provide essentially same concentration in each formulation) |
| Advawax 140 | 0.5 |
| Advawax 280 | 0.5 |

[c] See footnotes to Table II for ASTM procedures.

As can be seen from the foregoing, the present invention comtemplates a process for the liquid phase polymerization of vinyl monomers as well as processes for the combined liquid phase-vapor phase polymerization of such materials. Thus, the processes of this invention are effective in single-stage liquid phase polymerization of vinyl monomers; in two-stage liquid phase-vapor phase polymerization of vinyl monomers; and in mixed liquid-vapor phase polymerization of vinyl monomers, i.e., single-stage fluidized bed polymerization processes wherein a charge comprising liquid vinyl monomer or a liquid mixture of vinyl monomers, polymerization initiator, and monomer-soluble agglomeration inhibitor is introduced into a reaction zone together with vaporized monomer or mixture of monomers. The polymer product from the single-stage liquid phase polymerization effected according to the process of this invention can also be used as seed polymer and/or catalyst support for other vinyl polymerization processes.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A process for preparing polymers of vinyl chloride which comprises subjecting to liquid phase polymerization conditions in a substantially solvent-free environment a monomer charge comprising from 75 to 100 weight per cent of liquid vinyl chloride and from zero to 25 weight per cent of at least one compound copolymerizable with vinyl chloride under liquid phase polymerization conditions in the presence of a vinyl monomer polymerization initiator and at least one agglomeration inhibitor in the range of 0.2 to 4 weight per cent, based on the weight of monomer change, selected from the class consisting of hydrogenated butadiene-styrene copolymer, methyl methacrylate-styrene-acrylonitrile terpolymer, and mixtures thereof, said agglomeration inhibitor being soluble in said monomer charge to form a reaction mixture comprising polymer of vinyl chloride.

2. The process of claim 1 wherein said agglomeration inhibitor is hydrogenated butadiene-styrene copolymer.

3. The process of claim 1 wherein said agglomeration inhibitor is in the range of 0.5 to 2.5 weight per cent, based on the weight of monomer charge.

4. The process of claim 3 wherein said agglomeration inhibitor is hydrogenated butadiene-styrene copolymer.

5. In a process for preparing polymers of vinyl chloride comprising contacting in a first stage a monomer charge comprising liquid vinyl chloride or a liquid mixture of a major amount of vinyl chloride and a minor amount of at least one compound copolymerizable with vinyl chloride and a polymerization initiator under polymerization conditions while maintaining the contents of the polymerization zone in an agitated condition induced by a high speed mixing device to convert up to 15 per cent of said monomer charge to polymer and thereafter continuing said polymerization in a second stage in an agitated condition induced by a mixing device operated at a speed substantially slower than the mixing speed in said first stage, the improvement wherein said first stage polymerization is effected in the presence of from about 0.2 to 4 weight per cent, based on the weight of monomer charge, of an agglomeration inhibitor selected from the class consisting of hydrogenated butadiene-styrene copolymer, methyl methacrylate-styrene-acrylonitrile terpolymer, poly(vinyl acetate) and mixtures thereof said agglomeration inhitor being soluble in said monomer charge.

6. A process for preparing vinyl polymers comprising the steps of:

polymerizing under liquid phase polymerization conditions in a substantially solvent-free environment a monomer charge comprising from 75 to 100 weight per cent of liquid vinyl chloride and from zero to 25 weight per cent of at least one compound copolymerizable with vinly chloride under the polymerization conditions, in the presence of a vinyl monomer polymerization initiator and at least one agglomeration inhibitor in the range of 0.2 to 4 weight per cent, based on the weight of monomer charge selected from the class consisting of hydrogenated butadiene-styrene copolymer, methyl methacrylate-styrene-acrylonitrile terpolymer, poly(vinyl acetate), and mixtures thereof, said agglomeration inhibitor being soluble in said monomer charge, to form a reaction mixture comprising polymer of vinyl chloride; and contacting said polymer of vinyl chloride under vapor phase polymerization conditions in a substantially solvent-free environment with a vaporized monomer charge comprising from 75 to 100 weight per cent vinyl chloride and 25 to zero weight per cent of at least one compound which is copolymerizable with vinyl chloride under vapor phase polymerization conditions to form additional reaction product comprising polymer of vinyl chloride.

7. A process according to claim 6 wherein said reaction mixture comprising polymer of vinyl chloride is present in an amount ranging from 15 to 60 weight per cent, based on weight of total polymer product.

8. A process according to claim 6 wherein said vapor phase polymerization is effected in the presence of a polymer of vinyl chloride prepared according to the process of claim 2.

* * * * *